United States Patent [19]

Best et al.

[11] Patent Number: 4,556,597
[45] Date of Patent: Dec. 3, 1985

[54] ION DOPED SERVO PATTERN FOR MAGNETIC RECORDING DISK

[75] Inventors: John S. Best, San Jose; David C. Bullock, Saratoga, both of Calif.

[73] Assignee: International Business Machines Corporation, Armonk, N.Y.

[21] Appl. No.: 524,950

[22] Filed: Aug. 22, 1983

[51] Int. Cl.$^4$ .............................................. G11B 5/82
[52] U.S. Cl. ...................................... 428/201; 360/77; 369/14; 369/43; 428/446; 428/694; 428/900
[58] Field of Search .................... 360/77, 135; 369/14, 369/15, 43; 428/446, 201, 694, 209, 697, 900; 427/38, 43.1, 85, 129

[56] References Cited

U.S. PATENT DOCUMENTS 4,376,138  3/1983  Alferness et al. .................... 427/85
4,510,231  4/1985  Takeshita et al. .................... 430/314

FOREIGN PATENT DOCUMENTS 117346  9/1981  Japan .
2096384  10/1982  United Kingdom .

OTHER PUBLICATIONS

Potter, "Capacitive Servoing or Topographic Variations", IBM TDB, vol. 21, No. 6, p. 2506, (Nov. 1978).
Acosta et al., "Floppy Disc Embossing for Servo Applications", IBM TDB, vol. 21, No. 10, p. 4259, (3/1979).
Cannon, "Optical or Capacitive Digital Servos for Record Members", IBM TDB, vol. 19, No. 9, p. 3303, (2/1977).

Primary Examiner—George F. Lesmes
Assistant Examiner—William M. Atkinson
Attorney, Agent, or Firm—Walter J. Madden, Jr.; Thomas R. Berthold

[57] ABSTRACT

A magnetic recording disk substrate is provided with a capacitive servo pattern by implanting dopant material in the substrate to modify the substrate conductivity in a desired servo pattern.

13 Claims, 2 Drawing Figures

4,556,597

ION DOPED SERVO PATTERN FOR MAGNETIC RECORDING DISK

BACKGROUND OF THE INVENTION

1. Field of the Invention

This invention relates to magnetic recording disks and more particularly, to such disks having a capacitive servo pattern therein for use with a track following servo system.

2. Description of the Prior Art

Magnetic recording disk files have for a number of years employed some type of track following servo system to maintain one or more magnetic heads properly centered over a selected one of a plurality of concentric data recording tracks on a disk surface. Some disk files (usually larger capacity files) used one disk surface which contained the track following servo information and hence was dedicated to servo purposes. The major drawback to such dedicated servo surfaces is that they are necessarily positioned some distance from the data-containing surfaces in the disk file so that mechanical misalignment of the disks or magnetic heads can lead to errors in track following ability. This is a particular problem with the trend in disk files for higher and higher track densities with the concomitant demand for higher performance servo systems.

Other commercial disk files employ a so-called sector servo in which the track following servo information is stored in sectors which are interspersed around the disk surface between data portions. This approach has the advantage that the servo information is stored on the same surface as the data tracks which are to be followed by the servo system, but it has the disadvantage that the disk surface area devoted to the servo information results in a decrease in disk surface area available for data storage.

An approach which appears very attractive for servo systems is the so-called embedded servo in which the track following servo information is placed in the data disk—either in, below or above the data-containing layer—without reducing the data storage capacity of the data surface.

SUMMARY OF THE INVENTION

This invention provides a magnetic recording disk structure including a substrate having an embedded capacitive servo pattern contained therein.

DESCRIPTION OF THE PREFERRED EMBODIMENT

In accordance with the present invention, a magnetic disk substrate has implanted or thermally diffused therein material which modifies the conductivity or permitivity of the substrate in a pattern which corresponds to a desired capacitive servo pattern. This capacitive servo pattern can then be sensed by a suitable sensor through a magnetic layer which is applied to the substrate after the implantation or thermal diffusion.

The substrate may be any material suitable for doping, such as silicon or a silicon-containing substrate, gallium arsenide, semiconductive iron oxide materials, germanium, sapphire or polysilicon. Doping may be produced using any suitable technique such as ion implantation or thermal diffusion. The material implanted may be of any type capable of modifying the conductivity or permitivity of the substrate, such as n+ or p+ dopants, or a suitable metal. Also the desired servo pattern can be produced by doping an n+ material in a p type substrate, a p+ material in an n type substrate, a p+ material in a p type substrate, or an n+ material in an n type substrate.

Figure 1:
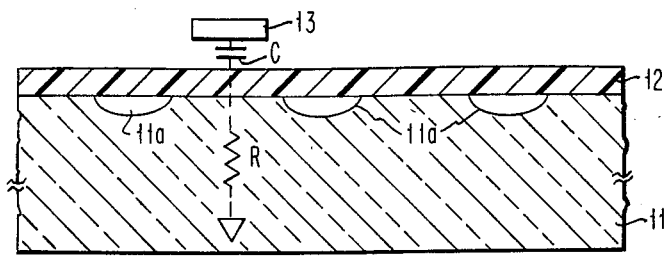
FIG. 1 is a cross-sectional view showing portions of an ion implanted or thermally diffused capacitive servo pattern in a silicon magnetic disk substrate.

FIG. 1 illustrates one embodiment of the present invention employing n+ or p+ dopants in a silicon substrate. Referring to the drawing, reference numeral 11 designates a disk substrate such as silicon or having a silicon coating. Silicon and silicon-surfaced substrates provide much better surface characteristics in terms of parameters such as flatness and roughness than currently used Al Mg substrates.

Prior to placing a magnetic coating on substrate 11, a capacitive servo pattern is produced therein by ion implantation in accordance with the present invention. Preferably, this implantation is done as follows. A layer of conventional photoresist is first applied to the substrate by a suitable technique such as spin coating. A pattern of the desired servo pattern is placed on the applied photoresist using conventional photolithography techniques. Ion implantation of a suitable dopant, either n+ or p+, is then accomplished through the photoresist layer in the areas of the servo pattern. Several such implanted areas are shown in the drawing as 11a. These doped areas in the high resistivity silicon ($\geq 100$ $\Omega$cm) form a conducting (high capacitance portions of the disk) pattern on the disk.

After such implantation, the photoresist may be stripped from the silicon surface and the substrate annealed to remove any implantation damage. A suitable dielectric magnetic coating 12 such as sputtered $Fe_2O_3$ or a particulate magnetic coating may then be applied to the silicon surface. Metallic magnetic layers cannot be employed in the present invention because they would shield the capacitive servo pattern from a capacitive sensor positioned on the other side of the metallic magnetic layer.

In operation, the implanted capacitive servo pattern may be sensed by a capacitive probe or sensor, represented schematically in the drawing by 13, which may be mounted on the same slider carrying the read/write head for magnetically interacting with magnetic layer 12. For adequate capacitance contrast between implanted and non-implanted regions, $R > 1/j\omega C$, where the capacitance C is measured with an RF current at frequency $\omega$.

Figure 2:
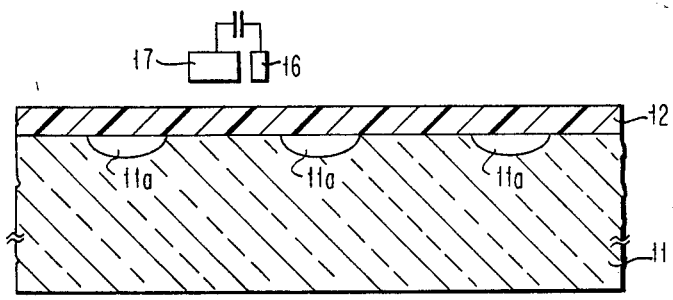
FIG. 2 is an alternate embodiment of the invention showing an electrically floating capacitive transducer.

The implanted conducting portion of the servo pattern can be electrically continuous to insure low resistance to ground. Contact to this region should be made where the disk is clamped to its spindle. It may be necessary to implant the inside diameter ring of the disk where it is clamped, and to apply an evaporated or sputtered metallic, ohmic contact to provide good grounding of the implanted region. This should be done before applying the magnetic coating. A second approach, shown in FIG. 2 with an electrically floating capacitive transducer 16, permits the substrate to float above ground. The rf signal returns to ground by coupling back through the slider 17 which itself is grounded. The exact servo pattern should be optimized to provide the best position error signal.

The invention has been demonstrated by ion implanting a servo pattern in a three-inch silicon substrate disk, applying a dielectric magnetic coating to the substrate and then sensing the capacitive servo pattern as the disk rotates. It was found that the implanted pattern gave excellent servo readback signals from a capacitive servo sensor residing in the slider.

As indicated above, a number of materials other than silicon may be used in the substrate, and techniques other than ion implantation of n+ or p+ dopant can be employed in practicing the present invention.

As an alternate to the use of the present invention for an embedded servo pattern, the techniques involved here may be used to record digital or analog signals to form a read-only memory for subsequent readback of the stored signals.

We claim:

1. A magnetic recording disk structure comprising:
   a substrate, said substrate being made of a dopable material,
   said substrate having doped areas therein which modify the conductivity or permitivity of said substrate to form a capacitive track following servo pattern, and
   a magnetic recording layer on said substrate.

2. A magnetic recording disk in accordance with claim 1 in which said magnetic recording layer is non-metallic.

3. A magnetic recording disk in accordance with claim 1 in which said dopant areas are produced by ion implantation.

4. A magnetic recording disk in accordance with claim 1 in which said substrate is silicon.

5. A magnetic recording disk in accordance with claim 1 in which said substrate is gallium arsenide.

6. A magnetic recording disk in accordance with claim 1 in which said substrate is germanium.

7. A magnetic recording disk in accordance with claim 1 in which said substrate is sapphire.

8. A magnetic recording disk in accordance with claim 1 in which said substrate is polysilicon.

9. A magnetic recording disk in accordance with claim 1 in which said dopant areas are produced by thermal diffusion.

10. A magnetic recording disk in accordance with claim 1 in which said dopant is an n+ material in a p type substrate.

11. A magnetic recording disk in accordance with claim 1 in which said dopant is a p+ material in an n type substrate.

12. A magnetic recording disk in accordance with claim 1 in which said dopant is a p+ material in a p type substrate.

13. A magnetic recording disk in accordance with claim 1 in which said dopant is an n+ material in a n type substrate.

* * * * *